(12) United States Patent
Katagiri et al.

(10) Patent No.: US 8,035,912 B2
(45) Date of Patent: Oct. 11, 2011

(54) SYSTEM AND METHOD FOR CONTROLLING TRAVELING OF TAPE

(75) Inventors: Takashi Katagiri, Yamato (JP); Motoko Oe, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 12/474,544

(22) Filed: May 29, 2009

(65) Prior Publication Data
US 2009/0296268 A1 Dec. 3, 2009

(30) Foreign Application Priority Data

May 30, 2008 (JP) ................................. 2008-142014

(51) Int. Cl.
*G11B 15/46* (2006.01)
*G11B 15/48* (2006.01)
(52) U.S. Cl. .................. 360/73.08; 360/73.04; 360/74.1
(58) Field of Classification Search .......................... None
See application file for complete search history.

(56) References Cited

U.S. PATENT DOCUMENTS

| 6,856,479 | B2 | 2/2005 | Jaquette et al. |
| 6,865,043 | B2 | 3/2005 | Ataku et al. |
| 6,958,878 | B2 * | 10/2005 | Jaquette et al. ............ 360/73.04 |
| 2003/0001036 | A1 * | 1/2003 | Beavers et al. ............ 242/334.5 |
| 2008/0007856 | A1 * | 1/2008 | Tango et al. .................... 360/53 |
| 2009/0125649 | A1 * | 5/2009 | Goker et al. .................... 710/57 |

* cited by examiner

*Primary Examiner* — Andrew L Sniezek
(74) *Attorney, Agent, or Firm* — Zilka-Kotab, PC

(57) ABSTRACT

A system and method for controlling the traveling of a tape is provided. The system and method include passing data in a buffer to a channel input/output unit for writing the data to a tape. A determining unit determines if second data is to be written to the tape without performing a backhitch after first data is written to the tape. The determination unit also determines a state of the system before writing the first data to the tape and compares an amount of second data written to the tape prior to writing first data to the tape with an amount of second data expected to be written to the tape to an area up to a position on the tape where writing the first data commenced, for determining if the second data is to be written to the tape without performing a backhitch. A speed adjusting unit adjusts the speed of the tape to prevent a backhitch due to the buffer running out of data when the determination unit determines that the second data is to be written to the tape without performing a backhitch.

8 Claims, 12 Drawing Sheets

(a)

(b)

SYSTEM AND METHOD FOR CONTROLLING TRAVELING OF TAPE

BACKGROUND OF THE INVENTION

1. Field of the Invention

The present invention relates to a system and a method for controlling the traveling of a tape, and more particularly, to a system and method for controlling the traveling of a tape in a tape drive which temporarily stores data transmitted from a higher-level system and then writes the data to the tape.

2. Background Information

A tape drive for writing data to a tape such as a magnetic tape temporarily stores data in a buffer, and then writes the data from the buffer to a tape at a convenient timing for the drive. To ensure that all the data transmitted to the drive is written to the tape, a host transmits to the drive a command for forcing the drive to write the data (WriteFM Non Immediate command). Such forced write from the buffer to the tape is called "synchronization".

If the tape is not stopped after the synchronization, a gap occurs between the data written in the preceding synchronization and the data subsequently written on the tape. As a result, part of the recording area of the tape is not used. To use more of the tape, a "backhitch" operation, hereinafter backhitch, needs to be performed. A backhitch is a series of the following operations: reducing the traveling speed of the tape to temporarily stop the tape; moving the tape in the reverse direction; thereafter moving the tape in the forward direction again to reach a position to which the subsequent data should be written; and finally writing the subsequent data to that position. The writing of the subsequent data cannot be performed before this backhitch is completed. Since a backhitch requires approximately two to three seconds, influence of the backhitch on performance of the tape drive is significant.

As a technique for avoiding such a situation, a Recursive Accumulating Backhitchless Flush (RABF) has been proposed. For example, when receiving a synchronous request, a tape drive writes data that is stored in a buffer and has not been written yet to a tape, to a temporary recording area (ABF wrap) allocated on the tape, while the tape drive keeps the tape continuously traveling. Such writing is called backhitchless flush (buffer flush without backhitch). In backhitchless flush, no backhitch is performed, since during ABF wrap writing, a gap between the data written in the preceding synchronization and the data written in the subsequent synchronization is not considered as a problem. Concurrently, the tape drive performs recursive write, which performs operations of accumulating data in the buffer during ABF wrap writing, and of rewriting the data to a normal recording area (standard wrap) of the tape, when either the buffer or the temporary recording area becomes full. Thus, in the RABF, synchronization requires no backhitch for the subsequent synchronization. Accordingly, the time required for synchronization may be reduced. The RABF may substantially enhance performance of tape drives where a synchronous request is made at a high frequency with respect to data amounts.

Thus, the RABF may enhance the synchronization performance of tape drives where the data amount transmitted from a host in a synchronous request (such data amount referred to as a "transaction size" below) is small. Accordingly, data of a certain transaction size or larger leads to an increase in overhead during the operations of writing data in a different location for temporary recording and of rewriting the data to a normal location. In such a case, data can be written faster by performing a backhitch than the RABF. Accordingly, there is a need for a technique for enhancing synchronous performance in a case where a transaction size is large.

Additionally, a backhitch may be performed when the buffer runs out of data to be written to the tape before completing writing data of a transaction size. This backhitch allows the tape drive to start writing the data again from a position of the tape subsequent to the position the last data is written, avoiding the tape to continuously move ahead, so as not to waste the capacity of the tape. Accordingly, there is a need for a technique that reduces any decrease in performance due to such a backhitch.

SUMMARY OF THE INVENTION

In one embodiment, a system for controlling the traveling of a tape in a tape drive which temporarily stores data in a buffer before writing the data to the tape, the system comprising: a determination unit for determining if second data is to be written to the tape without performing a backhitch after first data is written to the tape, the determination unit determining a state of the system before writing the first data to the tape, the second data comprising data stored adjacent to first data stored in the buffer; and a speed adjusting unit for adjusting the speed of the tape to prevent a backhitch due to the buffer running out of data when the determination unit determines that the second data is to be written to the tape without performing a backhitch.

In another embodiment, a system for controlling the traveling of a tape in a tape drive which temporarily stores, in a buffer, data transmitted from a higher-level system, and thereafter writes the data to the tape, the system comprising: a determination unit for determining if second data is to be written to the tape without performing a backhitch after first data is written to the tape, the determination unit determining a state of the system before writing the first data to the tape, the second data comprising data stored adjacent to first data stored in the buffer; a first speed choosing unit choosing a first speed when the determination unit determines that the second data is to be written to the tape without performing a backhitch, the first speed being the fastest speed satisfying a condition that time required for storing, in the buffer, data of a predetermined size transmitted from the higher-level system is shorter than time required for writing, to the tape, the data of the predetermined size stored in the buffer, among a plurality of speeds prepared in advance as the speed of the tape; a second speed choosing unit choosing a second speed that is slower than the first speed from the plurality of speeds, when the first speed chosen by the first speed choosing unit is used and a backhitch thereby occurred in any one of a last predetermined number of times of data writing; and a change unit changing the speed of the tape to the second speed after a backhitch is performed, when the second speed chosen by the second speed choosing unit is different from the current speed of the tape.

In an alternative embodiment, a method of controlling the traveling of a tape in a tape drive which temporarily stores, in a buffer, data transmitted from a higher-level system, and thereafter writes the data to the tape, the method comprising the steps of: determining whether or not to write second data, which is the data next to first data stored in the buffer, to the tape without performing any backhitch after the writing of the first data to the tape, on the basis of a state before the writing of the first data to the tape; and changing the speed of the tape so that no backhitch due to the buffer running out of data can occur, when it is determined that the second data is to be written to the tape without performing any backhitch.

Other, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

Figure 1:
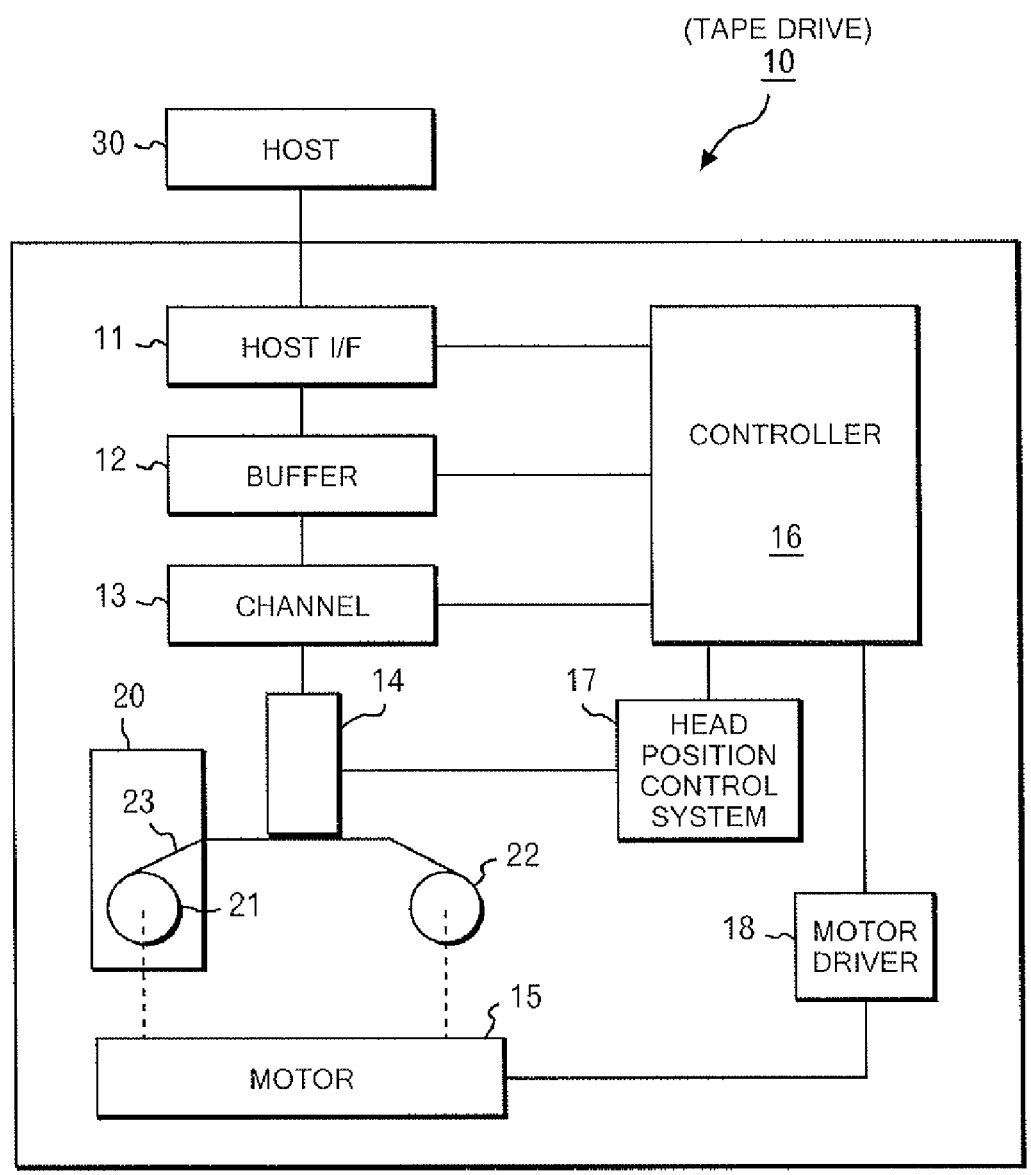
FIG. 1 is a block diagram showing a configuration of a tape drive to which an embodiment of the present invention is applied.

FIG. 1 is a diagram showing a configuration example of a tape drive 10 which implements this embodiment. The tape drive 10 includes a host interface (simply called a "host I/F" below) 11, a buffer 12, a channel 13, a head 14, and a motor 15. In addition, the tape drive 10 also includes a controller 16, a head position control system 17, and a motor driver 18. Here, the tape drive 10 can be loaded with a tape cartridge 20 by insertion. Hence, the tape cartridge 20 is also included in FIG. 1. The tape cartridge 20 includes a tape 23 wound around reels 21 and 22, and moves, with rotation of the reels 21 and 22, in the direction from the reel 21 to the reel 22 or in the direction from the reel 22 to the reel 21, that is, in a longitudinal direction. In this embodiment, a magnetic tape is used as an example of the tape 23. However, the tape 23 may be a tape other than a magnetic tape.

The host I/F 11 performs communications with the host 30, which is an example of a higher-level system. For example, the host I/F 11 receives, from the host 30, a command instructing the tape drive 10 to write data to the tape 23, a command instructing the same to wind the tape 23 to its certain position specified by the host 30, or a command instructing the same to read data from the tape 23. An example of a communications standard used in the host I/F 11 is a small computer system interface (SCSI). In the case of using SCSI, the first command corresponds to a write command, the second command corresponds to a locate command or a space command, and the third command corresponds to a read command. The host I/F 11 returns a response indicating whether an operation performed in response to the received command was successful or failed.

The buffer 12 is a memory, for example, a dynamic random access memory (DRAM), storing therein data to be written to the tape 23 or data read from the tape 23. The buffer 12 consists of multiple buffer segments, and each buffer segment stores therein a dataset, which is a unit of reading from and writing to the tape 23.

The channel 13 is a communications path used for transmitting, to the head 14, data to be written to the tape 23, or for receiving, from the head 14, data read from the tape 23.

The head 14 writes information to the tape 23, or reads information from the tape 23, when the tape 23 is in a state of moving in a longitudinal direction.

The motor 15 causes the reels 21 and 22 to rotate. Although the motor 15 is represented by a single square in FIG. 1, it is preferable that one motor 15 be provided for each of the reels 21 and 22, in other words, that two motors 15 are provided in total.

The controller 16 controls the entire tape drive 10. For example, the controller 16 controls the writing of data to the tape 23 or the reading of data from the tape 23 in accordance with a command received by the host I/F 11. In addition, the controller 16 also controls the head position control system 17 and the motor driver 18.

The head position control system 17 is a system for tracking intended one or multiple wraps. Here, a wrap is a group of multiple tracks of the tape 23. When wraps need to be switched, the head 14 also needs to be electrically switched to another state. The head position control system 17 controls such switchings.

The motor driver 18 drives the motor 15. In a case where two motors 15 are used as described above, two motor drivers 18 are provided accordingly.

In this embodiment, firstly, a technique for enhancing performance of synchronization processing in the tape drive 10 with the above-described configuration in a case where a transaction size is large will be proposed. Specifically, the tape drive 10 performs the writing of data to the same wrap including no backhitch (such writing called "backhitchless writing" below) at the expense of the capacity of the tape 23.

Generally, data can be written to the tape 23 in excess of the stated capacity of the tape 23 up to a certain margin. For example, assume that the stated capacity thereof is 500 GB, and that a margin of 7% is set. In such a case, data of up to 535 (=500×1.07) GB can be written to the tape 23 when the error rate is extremely low. Accordingly, the situation is not so serious for the user as long as capacity loss due to the backhitchless writing is 7% or less. In light of this fact, the margin of 35 (=535−500) GB in the above example is used for enhancing performance in this embodiment.

Figure 2:
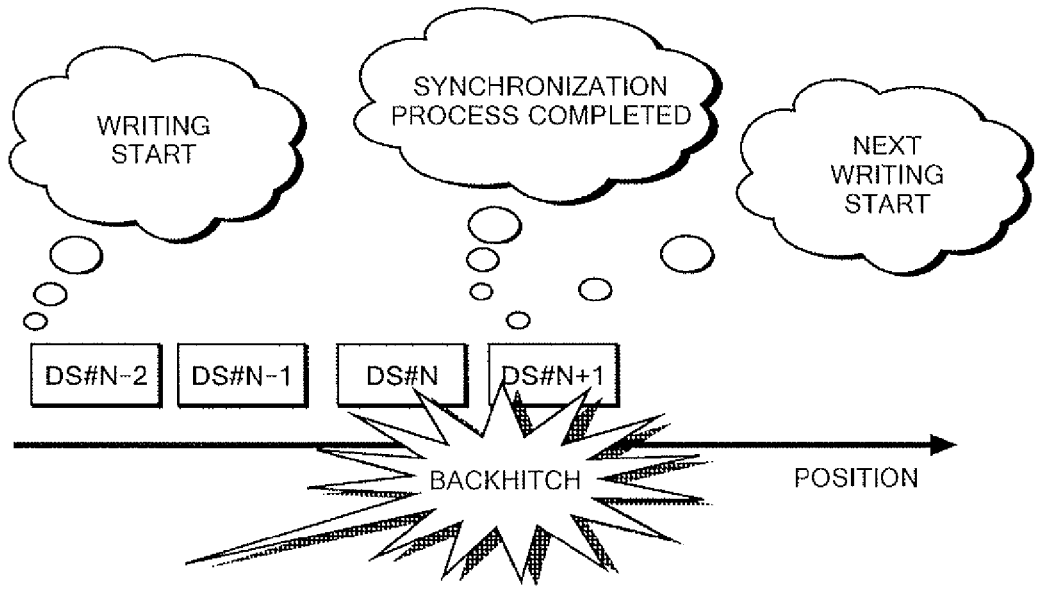
FIGS. 2A and 2B are views for making a comparison between writing with a backhitch and backhitchless writing.
Figure 2:
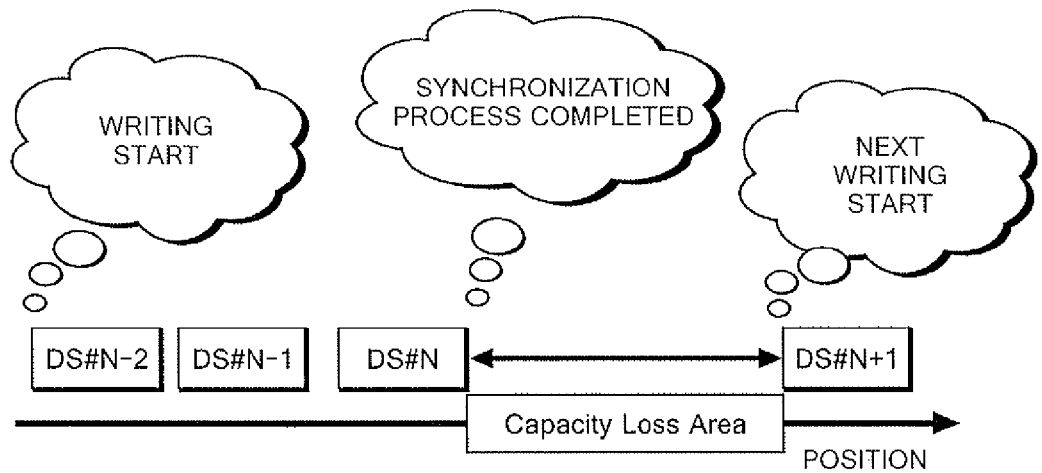

FIGS. 2A and 2B are views for illustrating a difference between the case of writing including a backhitch and the case of backhitchless writing. In FIGS. 2A and 2B, a dataset is denoted by "DS."

As shown in FIG. 2A, datasets DS#N−2, DS#N−1, DS#N, and DS#N+1 are written on the tape 23. Assume that writing in a synchronization process starts from the dataset DS#N−2, and that the synchronization process is completed at the dataset DS#N. At the time of completion of the synchronization process, a backhitch occurs. The backhitch requires approximately three seconds, and the tape drive 10 cannot start the next writing until the completion of the backhitch. In other words, the dataset DS#N+1 is written after the completion of the backhitch.

As shown in FIG. 2B, datasets DS#N−2, DS#N−1, DS#N, and DS#N+1 are written on the tape 23. Assume that writing in a synchronization process starts from the dataset DS#N−2, and that the synchronization process is completed at the dataset DS#N. In this case, however, no backhitch occurs. Accordingly, backhitchless writing does not require the time of approximately three seconds required in the case shown in FIG. 2A. Instead, the tape drive 10 moves the tape 23 in the forward direction at the expense of the capacity of the tape 23. Nevertheless, backhitchless writing is highly advantageous in terms of performance.

For this reason, backhitchless writing is employed in this embodiment. Specifically, upon receipt of a synchronous command, it is determined whether a backhitch is to be performed or backhitchless writing is to be performed, by checking the remaining capacity of the tape 23. With this configuration, even if backhitchless writing is performed in a synchronization process, the influence of the writing on the entire capacity of the tape 23 can be prevented.

In some cases, performance cannot be enhanced as expected even by using such an SWBF algorithm. This is attributable to the following fact. Even though the tape drive 10 does not perform any backhitch at the timing of a synchronization, a backhitch occurs at the time of normal writing when the transfer rate of the tape 23 is faster than that of the host 30.

In view of the above problem, a technique for enhancing performance in the above-described case, that is, for reducing the total number of backhitches in a writing sequence, is proposed in this embodiment. Specifically, in the technique, an ideal tape speed for the next transaction is estimated, and the tape drive 10 intentionally enforces a backhitch in order to change to the ideal tape speed.

In this embodiment, the above-described performance problem is solved by introducing a new logic for the SWBS. In this logic, an ideal tape speed for the next transaction is determined, and then whether or not to enforce a backhitch is determined on the basis of the determined tape speed.

Figure 3:
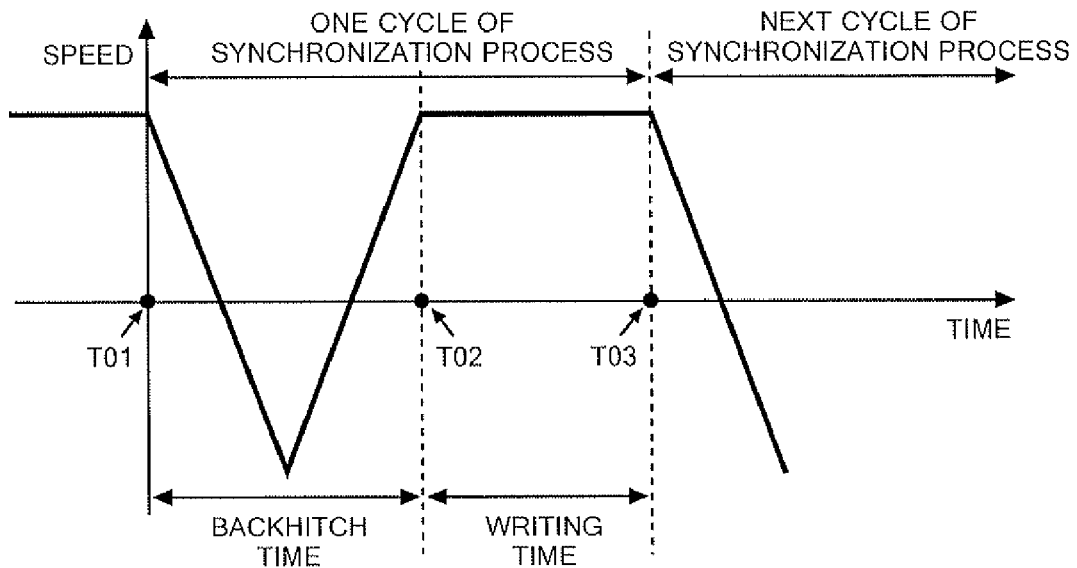
FIG. 3 is a graph showing a relationship between tape speed and time required for one cycle of a synchronization process in the case of not performing backhitchless writing.

FIGS. 3 to 6 each show a relationship between tape speed and time required for one cycle of a synchronization process. In each of FIGS. 3 to 6, the thick line shows a tape speed. FIG. 3 shows a normal case in which a back hitch occurs every time a synchronization process is completed. Specifically, in FIG. 3, a synchronization process is completed at time T01, and a backhitch is then started. Subsequently, in a backhitch time until time T02, the tape speed decreases once, increases and then decreases in the reverse direction, and thereafter increases again to return to the original speed. Then, in a writing time until time T03 when the synchronization process is completed, the next data is written.

Figure 4:
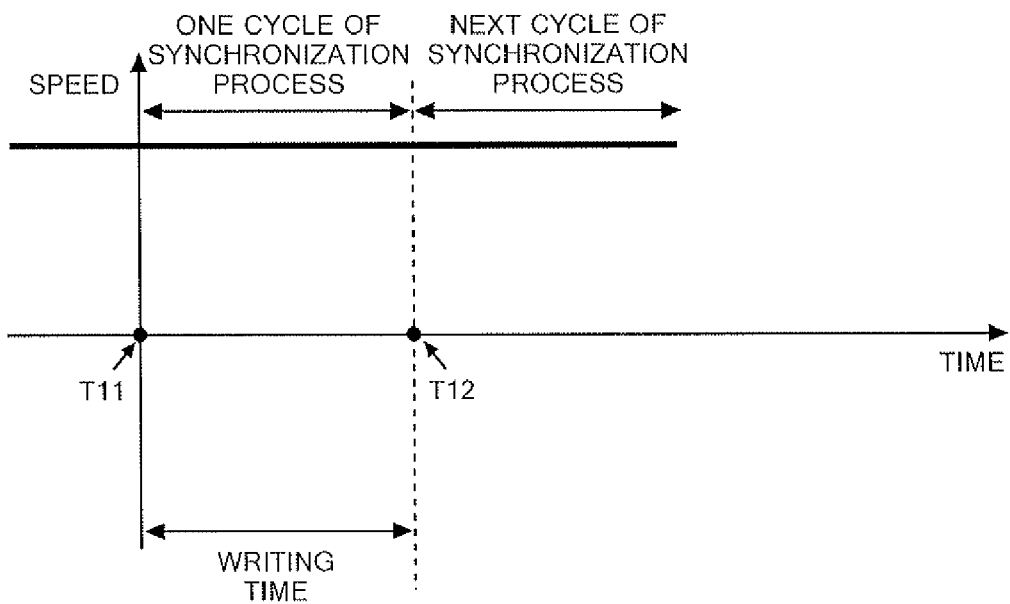
FIG. 4 is a graph showing a relationship between tape speed and time required for one cycle of a synchronization process in the case of performing backhitchless writing at an ideal tape speed.

FIG. 4 shows an ideal case of the SWBF. In this case, when a synchronization process is completed, the tape drive 10 does not perform any backhitch. Instead, the tape drive 10 starts to write the next data to the tape 23 in a backhitchless writing mode. Specifically, in FIG. 4, although a synchronization process is completed at time T11, the tape drive 10 does not perform any backhitch, but writes the next data in a writing time until time T12 when a synchronization process is completed.

Figure 5:
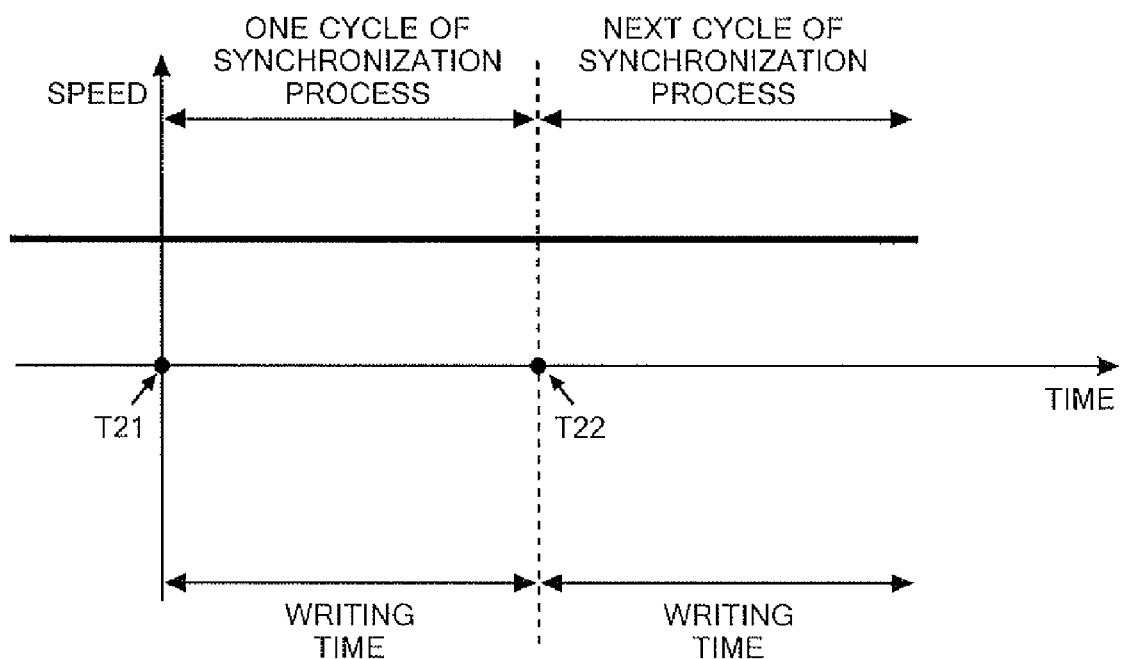
FIG. 5 is a graph showing a relationship between tape speed and time required for one cycle of a synchronization process in the case of performing backhitchless writing at a speed slower than the ideal tape speed.

FIG. 5 shows a case in which the same transaction size and host transfer rate as those in FIG. 4 are used while a slower tape speed is used than that in FIG. 4. In this case, no backhitch occurs. However, the time required for a synchronization process is longer than that of the ideal case since the slower tape speed is used. Specifically, in FIG. 5, although a synchronization process is completed at time T21, the tape drive 10 does not perform any backhitch, but writes the next data in a writing time until T22 when a synchronization process is completed. Here, the time from time T21 to time T22 is longer than that from time T11 to time T12 in FIG. 4.

Figure 6:
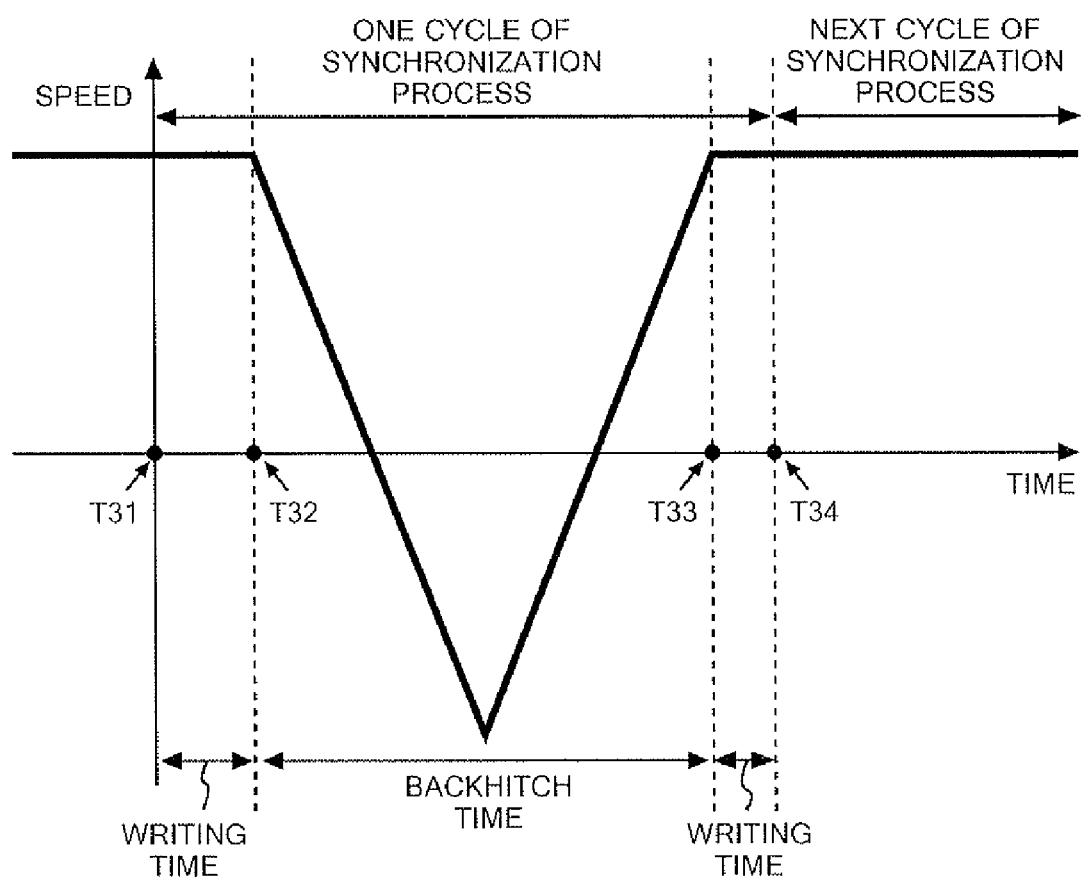
FIG. 6 is a graph showing a relationship between tape speed and time required for one cycle of a synchronization process in the case of performing backhitchless writing at a speed faster than the ideal tape speed.

FIG. 6 shows a case in which the same transaction size and host transfer rate as those in FIG. 4 are used while a faster tape speed than that in FIG. 4 is used. In this case, when the transfer rate of the tape 23 is faster than that of the host 30, the buffer 12 runs out of data before the host 30 completes transfer of all transactions to the tape drive 10. Then, the tape drive 10 enforces a backhitch. Specifically, in FIG. 6, although a synchronization process is completed at time T31, the tape drive 10 does not perform any backhitch, but writes the next data in a writing time after time T31. However, since the tape speed is too fast, the buffer 12 runs out of data at time T32, and a backhitch occurs at time T32 accordingly. Subsequently, in a backhitch time until time T33, the tape speed decreases once, increases and then decreases in the reverse direction, and thereafter increases again to return to the original speed. Then, in a writing time until time T34 when a synchronization process is completed, the tape drive 10 continues to write data. Hence, in the case shown in FIG. 6, the time required for a single synchronization process includes the time for a backhitch, and thus the SWBF in such a case does not have the advantage in performance over a normal synchronization process.

In order to avoid the cases shown in FIGS. 5 and 6, in this embodiment, the tape speed is changed by enforcing a backhitch, instead of performing backhitchless writing consistently at a faster or lower tape speed than the ideal tape speed. Moreover, a recent history of the tape drive 10 is used to calculate the ideal tape speed, and information on backhitch occurrence and tape speeds of the past is used to ensure performance at the chosen tape speed.

Firstly, an ideal tape speed is calculated on the basis of the average of the past transaction sizes and the average of the past host transfer rates. Then, the tape speeds chosen respectively for the past transactions and results of whether or not a backhitch due to the buffer running out of data has occurred at the respective chosen speeds are referred. If a backhitch has occurred in a past transaction at the same speed as the calculated speed, such a backhitch may occur again in the next transaction. Accordingly, a speed slower than the calculated speed is to be used. By choosing a slower speed at the timing of a synchronization as described above, no backhitch occurs in the next transaction, and therefore the total number of backhitches in a writing sequence decreases accordingly.

When the current tape speed is not equal to the ideal speed after the ideal speed is determined by means of the above method, the tape drive 10 enforces a backhitch. Here, the calculated speed may be faster or slower than the current speed used in the SWBF. When the current speed is equal to the ideal speed, the tape drive 10 performs backhitchless writing under the condition that the standard for capacity for enabling the SWBF is satisfied.

Figure 7:
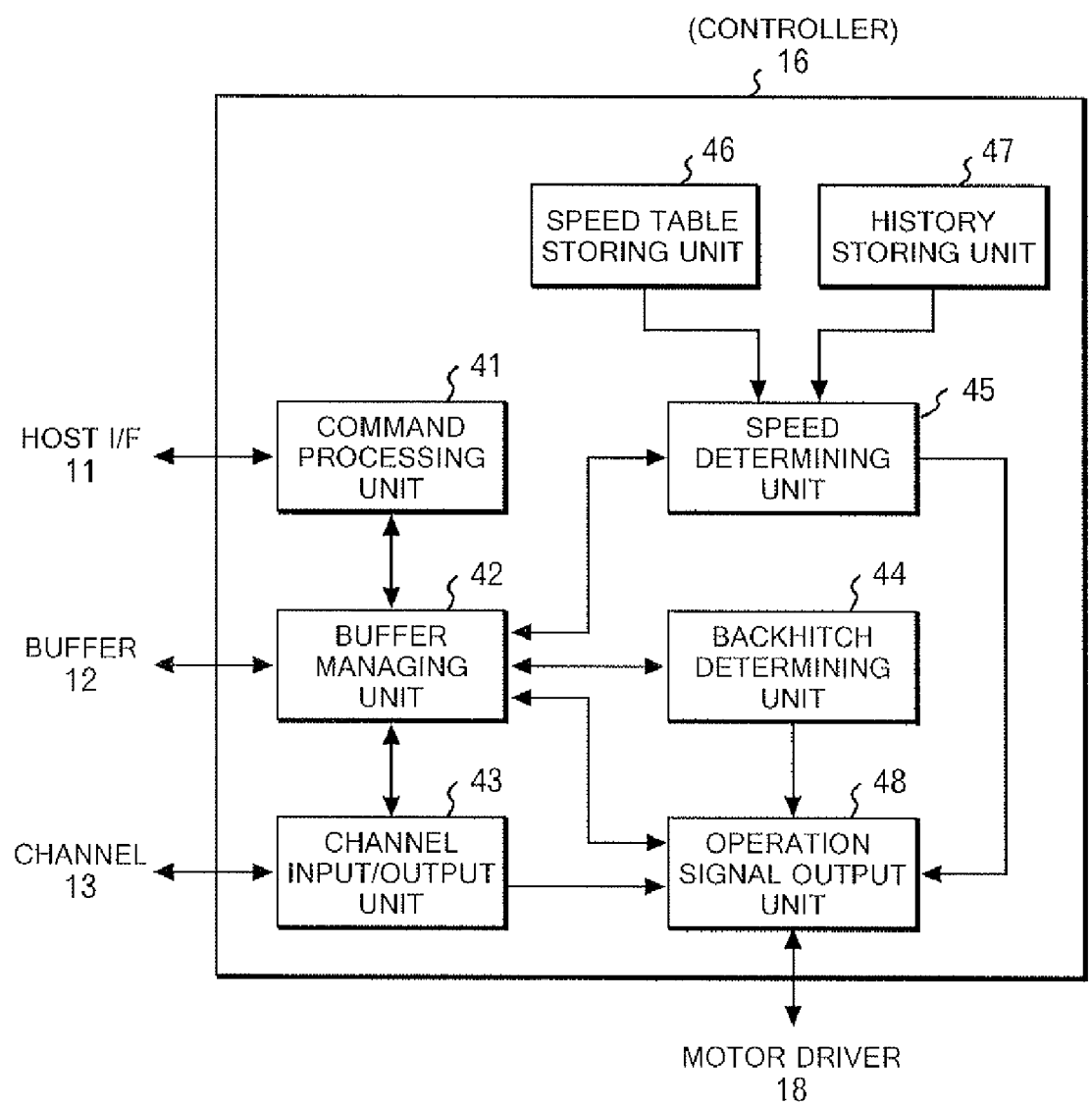
FIG. 7 is a block diagram showing a functional configuration example of a controller according to the embodiment of the present invention.

As shown in FIG. 7, the controller 16 includes a command processing unit 41, a buffer managing unit 42, a channel input/output unit 43, a backhitch determining unit 44, a speed determining unit 45, a speed table storing unit 46, a history storing unit 47, and an operation signal output unit 48. The command processing unit 41 receives a command from the host I/F 11. Here, the command may be a write command for instructing the tape drive 10 to store data in the buffer 12 or a synchronous command (a Write FM command or the like) for instructing the same to write data stored in the buffer 12 to the tape 23.

The buffer managing unit 42 prepares the data in the buffer 12 when the command processing unit 41 received a write command. On the other hand, when the command processing unit 41 received a synchronous command, the buffer managing unit 42 reads the data from the buffer 12 to output the read data to the channel input/output unit 43.

The channel input/output unit 43 outputs, to the channel 13, the data read from the buffer 12 by the buffer managing unit 42, or stores, in the buffer 12, the data received from the channel 13. The backhitch determining unit 44 determines whether or not data of an amount equal to the stated capacity of the tape 23 can eventually be written to the tape 23, and thereby determines whether or not to perform backhitchless writing. In this embodiment, the backhitch determining unit 44 is provided as an example of a determining unit for determining whether or not to write the second data to the tape without performing any backhitch after the first data was written to the tape.

The speed determining unit 45 determines such a tape speed that no backhitch due to the buffer running out of data can occur, when the backhitch determining unit 44 determines to perform backhitchless writing. In this embodiment, the speed determining unit 45 is provided as an example of a changing unit for changing the speed of the tape. The speed table storing unit 46 stores therein a speed table including correspondences of the speeds prepared in advance as the speed of the tape 23 and the tape transfer rates in a case where the tape 23 is caused to travel at the speeds.

The history storing unit 47 stores therein history information including correspondence of information on each transaction processed in the past, the speed of the tape 23 when the corresponding transaction was processed, a result of whether or not a backhitch occurred when the corresponding transaction was processed, and the like. Here, the history information may include different kinds of information (information on error occurrence, for example) from those described above.

The operation signal output unit 48 outputs, to the motor driver 18, a signal for instructing the tape drive 10 to perform an operation determined by the backhitch determining unit 44 or the speed determining unit 45.

Figure 8:
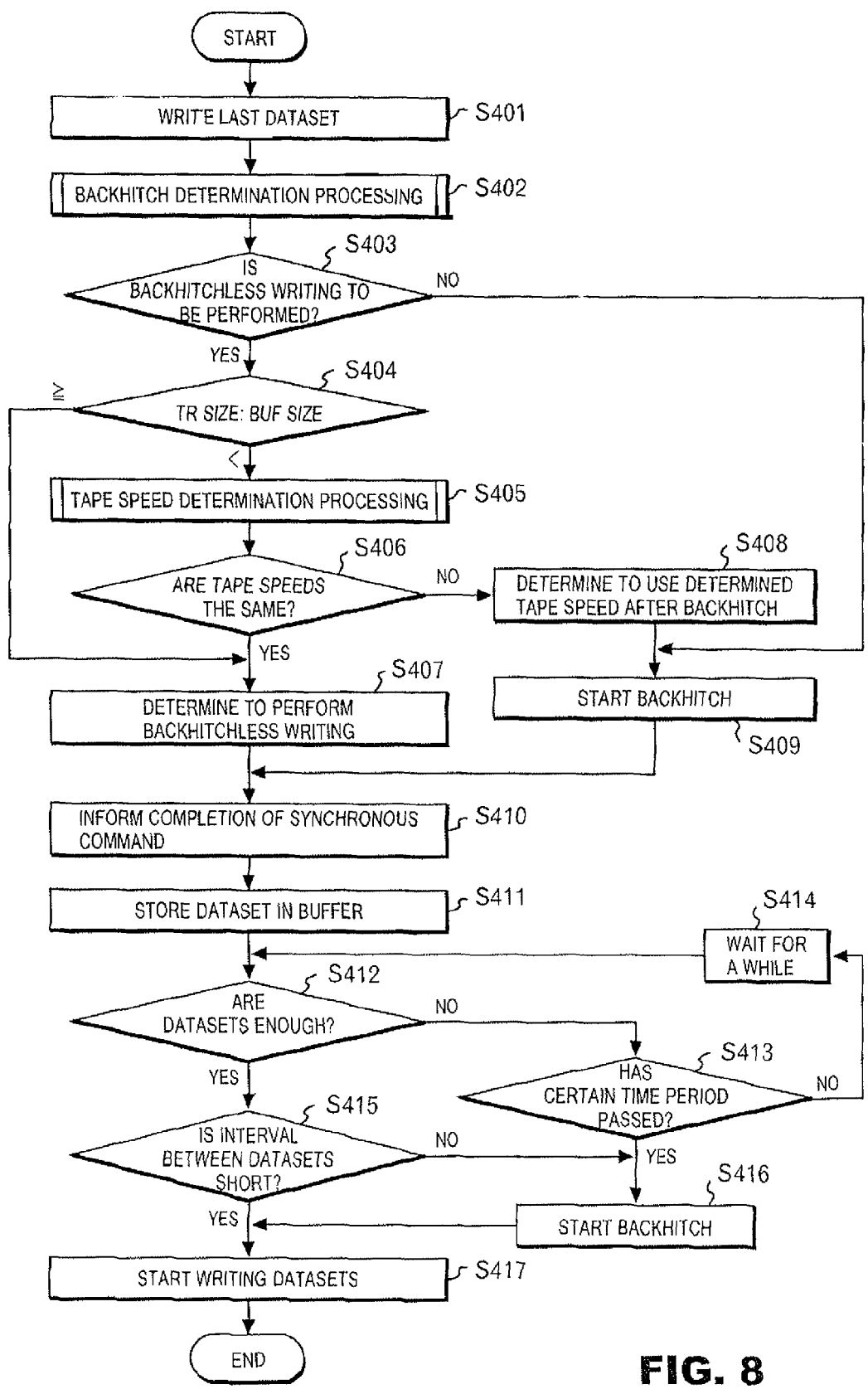
FIG. 8 is a flowchart showing an operation example of the controller according to the embodiment of the present invention.

FIG. 8 is a flowchart showing an operation example of the controller 16. Here, assume that this operation example starts when datasets in the buffer 12 are written to the tape 23 in response to a synchronous command. In the controller 16, during the writing of the datasets, the buffer managing unit 42 reads the last dataset from the buffer 12 and then passes the read dataset to the channel input/output unit 43, and then the channel input/output unit 43 writes the received dataset to the tape 23 (step 401). In this event, the buffer managing unit 42 is informed that the last dataset has been written to the tape 23. Accordingly, the buffer managing unit 42 instructs the backhitch determining unit 44 to determine whether or not to perform a backhitch. Thereby, the backhitch determining unit 44 performs backhitch determination processing for determining whether or not to perform a backhitch, from the perspective of possibility that data of the stated capacity of the tape 23 can eventually be written to the tape 23 (step 402). This backhitch determination processing will be described later in detail. The determination result obtained in the backhitch determination processing is then outputted to the operation signal output unit 48.

Upon receipt of the determination result, the operation signal output unit 48 determines whether or not the determination result indicates that backhitchless writing is to be performed (step 403). Here, when the determination result indicates that backhitchless writing is not to be performed, the operation signal output unit 48 outputs a signal to start a backhitch, to the motor driver 18 (step 409). By contrast, when the determination result indicates that backhitchless writing is to be performed, the operation signal output unit 48 passes the control back to the buffer managing unit 42. Thereafter, the buffer managing unit 42 compares a transaction size (denoted by "TR size" in FIG. 8) and the size of the buffer 12 (denoted by "BUF size" in FIG. 8) (step 404). Here, the average value of the sizes of the last three transactions, for example, is preferably used as the transaction size.

When a comparison result indicates that the transaction size is smaller than the size of the buffer 12, the buffer managing unit 42 instructs the speed determining 45 to determine a new speed of the tape 23. Thereby, the speed determining unit 45 performs tape speed determination processing for determining a new speed of the tape 23 (step 405). This tape speed determination processing will also be described later in detail.

When the current tape speed is different from the tape speed determined in the tape speed determination processing, writing in the SWBF mode is not performed. Instead, a backhitch is performed, and the tape speed is then changed. Specifically, the speed determining unit 45 determines whether or not the current tape speed is equal to the tape speed determined in step 405 (step 406). When these tape speeds are equal, the speed determining unit 45 determines to perform backhitchless writing (step 407). When these tape speeds are not equal, the tape speed determining unit 45 determines that the tape speed determined in step 405 is to be used after a backhitch, and then informs the operation signal output unit 48 of this determination (step 408). The operation signal output unit 48 outputs a signal to start a backhitch, to the motor driver 18 (step 409). After the backhitch, the speed of the tape 23 is changed. The processing in step 406 to step 409 corresponds to the above-described third process.

On the other hand, when the buffer managing unit 42 determines, in step 404, that the transaction size is larger than the size of the buffer 12, the speed determining unit 45 determines to perform backhitchless writing (step 407). When backhitchless writing is determined to be performed, or a backhitch is started, the command processing unit 41 is informed of the situation, and the command processing unit 41 then notifies the host 30 of the completion of the synchronous command (step 410). Thereafter, the command processing unit 41 receives the next datasets, and then transmits the received datasets to the buffer managing unit 42. The buffer managing unit 42 then stores the received datasets in the buffer 12 (step 411).

Subsequently, the buffer managing unit 42 determines whether or not enough datasets to start new writing have been received (step 412). When determining that received datasets are not enough, the buffer managing unit 42 proceeds to determination on whether or not a certain time period has passed after the completion of step 410 (step 413). When the certain time period has not passed yet, the buffer managing unit 42 waits for a while (step 414), and then performs the determination in step 412 again. When the certain time period has passed already, the buffer managing unit 42 passes the control to the operation signal output unit 48. Then, the operation signal output unit 48 outputs a signal to start a backhitch, to the motor driver 18 (step 416). When the buffer managing unit 42 determines, in step 412, that enough datasets has been received, the buffer managing unit 42 determines whether or not the interval between the current position of the head 14 and the position of the end of the last written dataset is short (step 415). For example, the buffer managing unit 42 determines whether or not the interval is longer than a dataset interval threshold value.

When the certain time period has passed after the completion of step 410, or when enough datasets are received and the interval between the current position of the head 14 and the position of the end of the last written dataset is long, the buffer managing unit 42 passes the control to the operation signal output unit 48. Thereafter, the operation signal output unit 48 outputs a signal to start a backhitch, to the motor driver 18 (step 416). Then, the buffer managing unit 42 reads the datasets from the buffer 12, and then passes the read datasets to the channel input/output unit 43. The channel input/output unit 43 writes the received datasets to the tape 23 (step 417).

On the other hand, when the interval between the current position of the head 14 and the position of the end of the last written dataset is short, no backhitch is performed. Instead, the buffer managing unit 42 reads the datasets from the buffer 12, and then passes the read datasets to the channel input/output unit 43. The channel input/output unit 43 writes the received datasets to the tape 23 (step 417).

Next, the backhitch determination processing in step 402 will be described in detail. As described above, the backhitch determination processing is for determining whether or not to perform backhitchless writing from the perspective of whether or not data of the stated capacity of the tape 23 can eventually be written to the tape 23. As the determination operations, four operation examples are conceivable. Accordingly, the four operation examples will be described below one by one.

Figure 9:
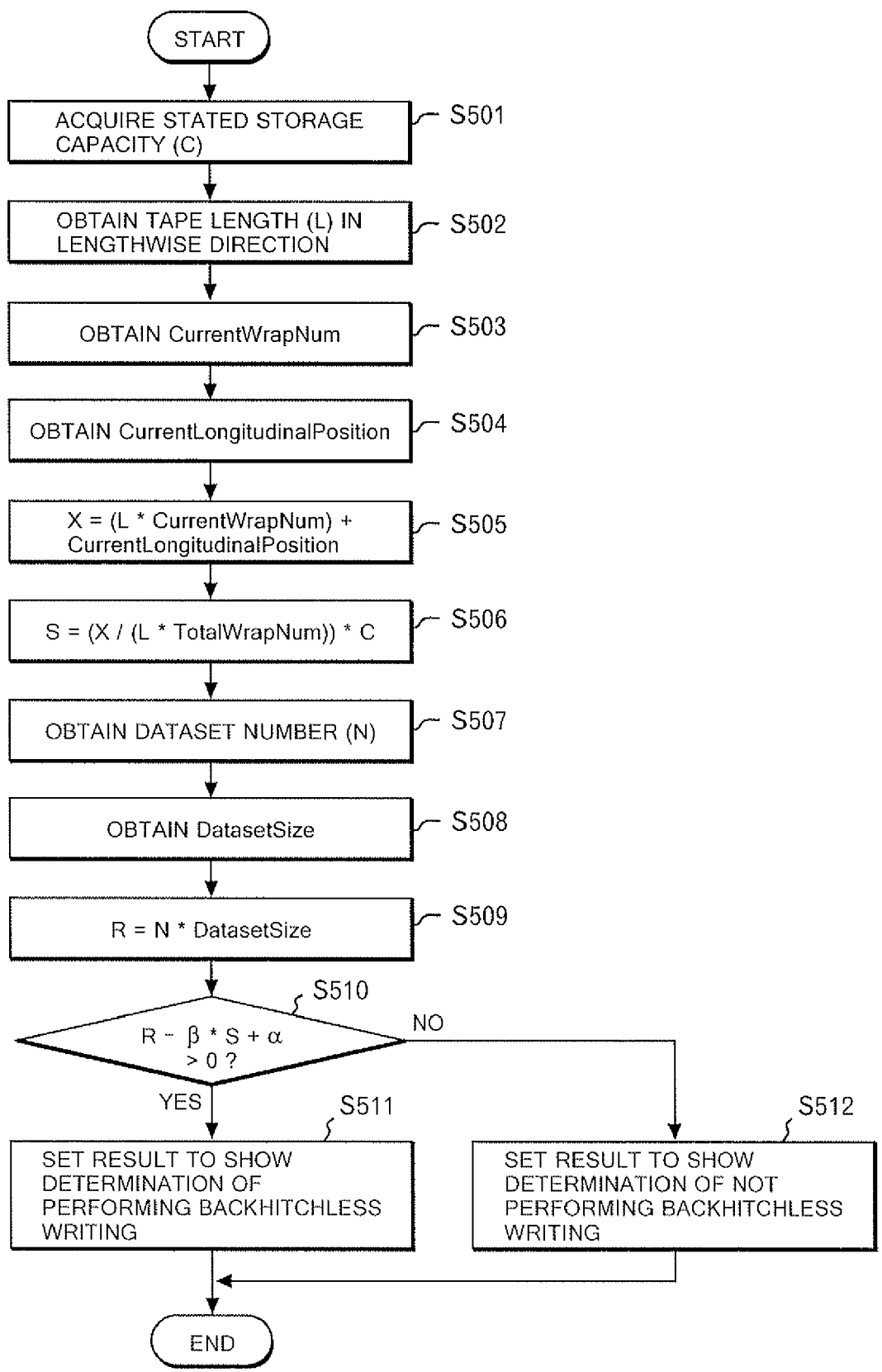
FIG. 9 is a flowchart showing a first operation example of a backhitch determining unit in the controller according to the embodiment of the present invention.

FIG. 9 is a flowchart showing the first operation example. Firstly, the backhitch determining unit 44 obtains the stated storage capacity (C) of the tape 23 (step 501). Thereafter, the backhitch determining unit 44 obtains the tape length (L) of the tape 23 in the longitudinal direction (step 502). Here, the storage capacity (C) and the tape length (L) can be obtained, for example, from a cartridge memory provided in the tape cartridge 20, when the tape cartridge 20 is loaded.

Then, the backhitch determining unit 44 obtains the number of the wrap (CurrentWrapNum) at which the head 14 is currently positioned (step 503). In this embodiment, data are written to the tape 23 by using multiple heads 14. In this event, first, while the tape 23 is moved from the BOT (beginning of tape) to the EOT (end of tape) in a first direction, first multiple data tracks are written. Thereafter, the direction of the tape 23 is reversed, and while the tape 23 is moved in a second direction, second multiple data tracks are written from the EOT to the BOT. In this case, the first multiple data tracks compose a first "wrap," and the second multiple data tracks compose a second "wrap." The tape 23 is composed of multiple wraps, and the wrap numbers take values from 0 to (N−1), respectively, where N represents the total number of the wraps of the tape 23.

Subsequently, the backhitch determining unit 44 further obtains the current position of the head 14 in the longitudinal direction (CurrentLongitudinalPosition) (step 504). On the tape 23, for example, multiple servo bands are prewritten in a non-data area along the tape length (L). Longitudinal position (LPOS) information is encoded on multiple sequential servo patterns formed on the servo bands. Step 504 may include decoding of the multiple servo patterns for identifying the LPOS of the head 14.

Then, the backhitch determining unit 44 calculates a parameter (X) for the head 14 (step 505). Here, the parameter X is set to a value obtained by multiplying the tape length L obtained in step 502 by the wrap number CurrentWrapNum obtained in step 503 and then by adding position CurrentLongitudinalPosition obtained in step 504 to the value obtained from the multiplication. Thereafter, the backhitch determining unit 44 sets an expected capacity (S) up to the current position at "(X/(L*TotalWrapNum))*C" (step 506). Here, TotalWrapNum represents the total number of the wraps of the tape 23.

Then, the backhitch determining unit 44 obtains the current dataset number (N) (step 507), and also obtains the dataset size (DatasetSize) (step 508). The number (N) and the dataset size (DatasetSize) can be obtained from the buffer managing unit 42, for example. The backhitch determining unit 44 sets an actual amount of data (R) up to the current position at a value obtained by multiplying the current dataset number (N) obtained in step 507 by the dataset size (DatasetSize) obtained in step 508 (step 509).

Lastly, the backhitch determining unit 44 determines whether or not "R−S*β+α" exceeds "0" (step 510). When the backhitch determining unit 44 determines that "R−S*β+α" exceeds "0," the determination result is set to indicate that backhitchless writing is to be performed when new writing operations are started (step 511). By contrast, when the backhitch determining unit 44 determines that "R−S*β+α" does not exceed "0," the determination result is set to indicate that backhitchless writing is not to be performed when new writing operations are started (step 512).

In the above expression, α is a constant value for easily invoking this function near the BOT, and is set to approximately 5 GB, for example. Moreover, β is set to approximately 1.05, for example. Here, α and β are preferably set by the manufacturer of the tape drive 10 or the tape 23, for example. As described previously, data can be written to the tape 23 in excess of the stated capacity of the tape 23 up to a certain margin. Accordingly, α and β can be set in such a range that S*β+α cannot exceed the recording capacity of the tape 23.

Figure 10:
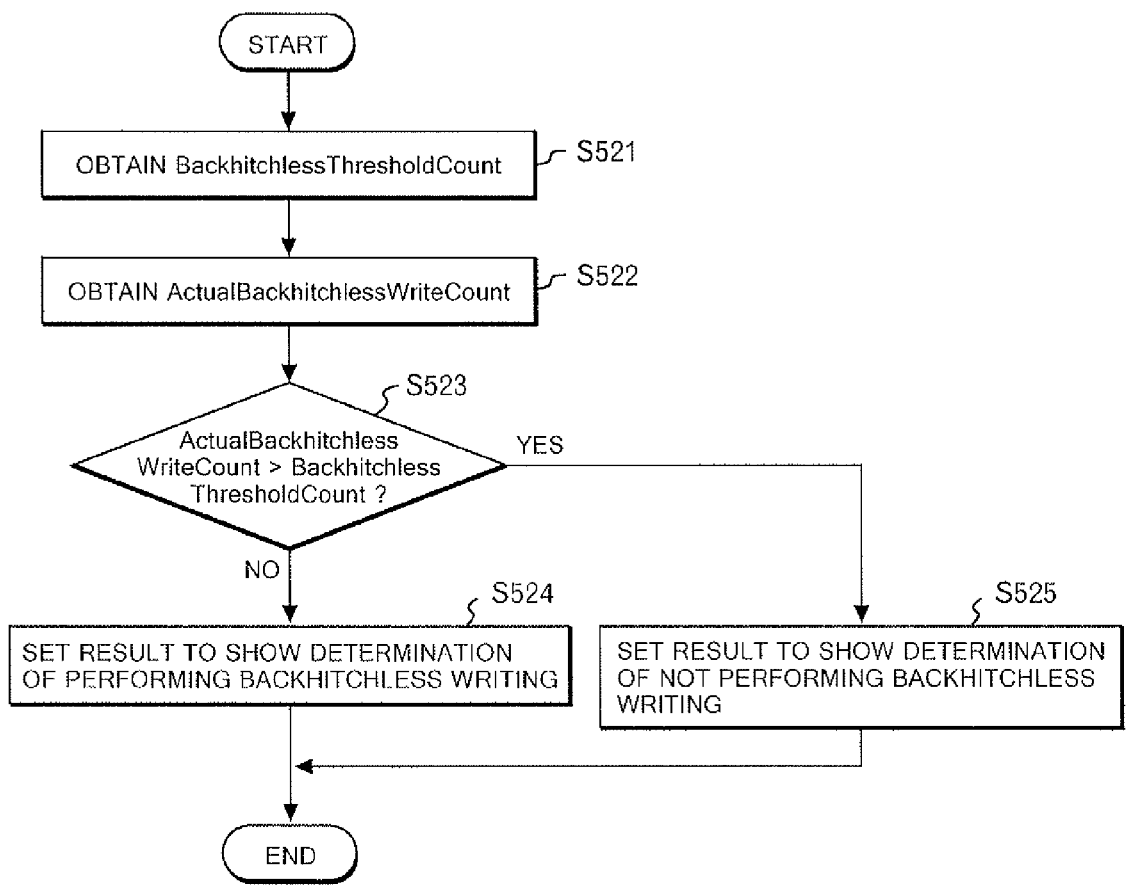
FIG. 10 is a flowchart showing a second operation example of the backhitch determining unit in the controller according to the embodiment of the present invention.

FIG. 10 is a flowchart showing the second operation example. The backhitch determining unit 44 firstly obtains the maximum number of backhitchless writing times (BackhitchlessThresholdCount) permissible to occur on the tape 23 (step 521). Here, the maximum number BackhitchlessThresholdCount is preferably set by the manufacturer of the tape drive 10 or the tape 23, for example. In addition, the backhitch determining unit 44 also obtains the number of backhitchless writing times having already occurred on the tape 23 in the current writing processing (ActualBackhitchlessWriteCount) (step 522). Here, the actual number ActualBackhitchlessWriteCount is preferably obtained on the basis of the history information stored in the history storing unit 47.

Subsequently, the backhitch determining unit 44 determines whether or not the actual number ActualBackhitchlessWriteCount exceeds the maximum number BackhitchlessThresholdCount (step 523). Then, when the backhitch determining unit 44 determines that the actual number ActualBackhitchlessWriteCount does not exceed the maximum number BackhitchlessThresholdCount, the determination result is set to indicate that backhitchless writing is to be performed when new writing operations are started (step 524). By contrast, when the backhitch determining unit 44 determines that the actual number ActualBackhitchlessWriteCount exceeds the maximum number BackhitchlessThresholdCount, the determination result is set to indicate that backhitchless writing is not to be performed when new writing operations are started (step 525).

Figure 11:
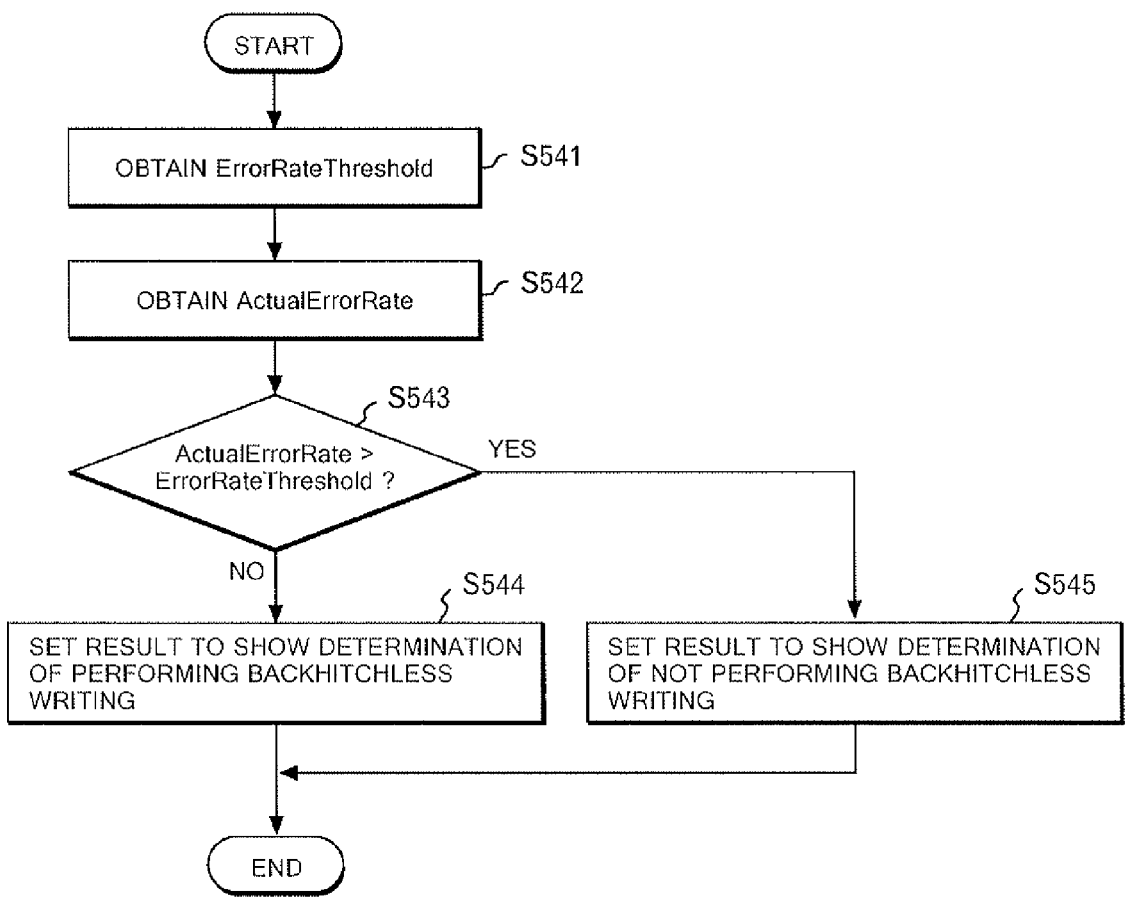
FIG. 11 is a flowchart showing a third operation example of the backhitch determining unit in the controller according to the embodiment of the present invention.

FIG. 11 is a flowchart showing the third operation example. Firstly, the backhitch determining unit 44 obtains the maximum error rate (ErrorRateThreshold) permitted when backhitchless writing is performed on the tape 23 (step 541). Here, the maximum error rate ErrorRateThreshold is preferably set by the manufacturer of the tape drive 10 or the tape 23, for example. In addition, the backhitch determining unit 44 also obtains an actual error rate (ActualErrorRate) of the tape 23 (step 542). Here, the actual error rate ActualErrorRate is preferably obtained on the basis of the history information stored in the history storing unit 47.

Subsequently, the backhitch determining unit 44 determines whether or not the actual error rate ActualErrorRate exceeds the maximum error rate ErrorRateThreshold (step 543). Then, when the backhitch determining unit 44 determines that the actual error rate ActualErrorRate does not exceed the maximum error rate ErrorRateThreshold, the determination result is set to indicate that backhitchless writing is to be performed when new writing operations are started (step 544). By contrast, when the backhitch determining unit 44 determines that the actual error rate ActualErrorRate exceeds the maximum error rate ErrorRateThreshold, the determination result is set to indicate that backhitchless writing is not to be performed when new writing operations are started (step 545).

Figure 12:
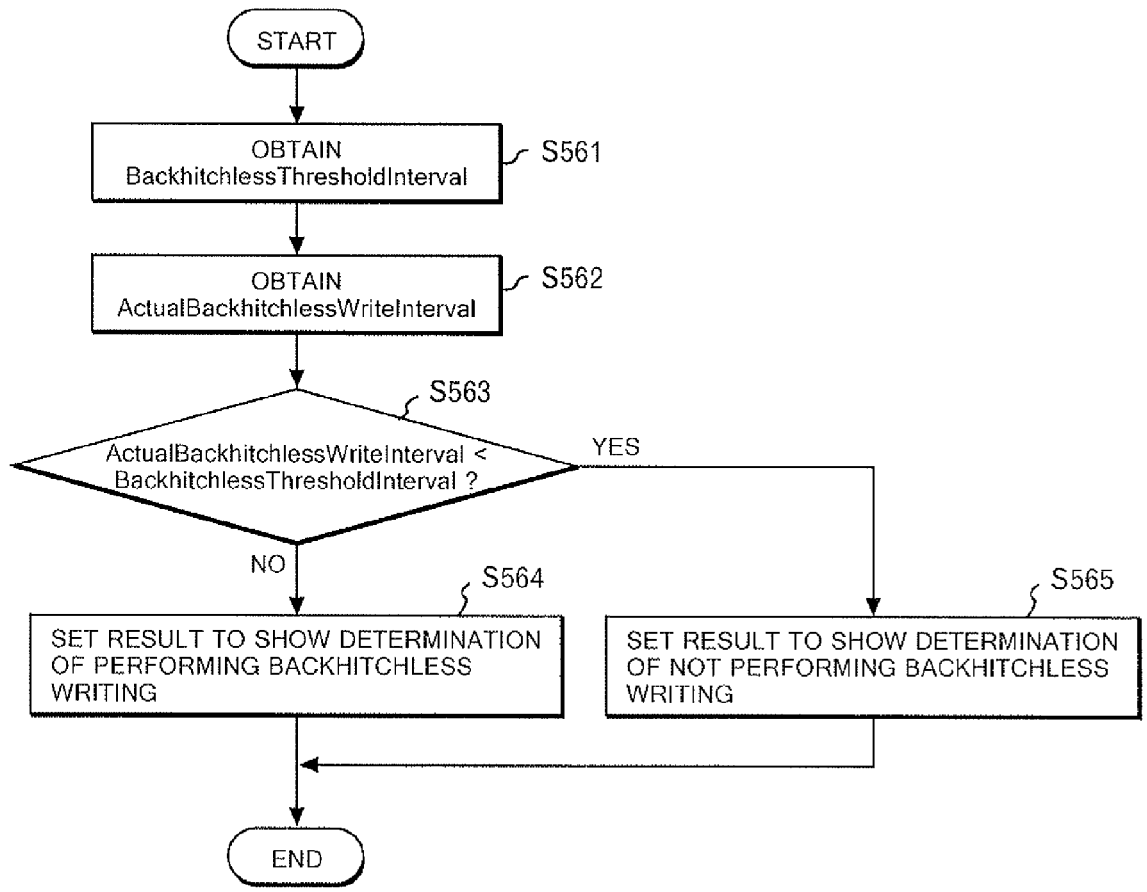
FIG. 12 is a flowchart showing a fourth operation example of the backhitch determining unit in the controller according to the embodiment of the present invention.

FIG. 12 is a flowchart showing the fourth operation example. Firstly, the backhitch determining unit 44 obtains the minimum tape length (BackhitchlessThresholdInterval) between backhitchless writing and the preceding backhitchless writing occurring on the tape 23 (step 561). Here, the minimum tape length BackhitchlessThresholdInterval is preferably set by the manufacturer of the tape drive 10 or the tape 23, for example. In addition, the backhitch determining unit 44 also obtains an actual tape length (ActualBackhitchlessWriteInterval) between the current position of the head 14 and the last backhitchless writing (step 562). Here, the actual tape length ActualBackhitchlessWriteInterval is preferably obtained on the basis of LPOS information read by a servo head.

Subsequently, the backhitch determining unit 44 determines whether or not the actual tape length ActualBackhitchlessWriteInterval is below the minimum tape length BackhitchlessThresholdInterval (step 563). Then, when the backhitch determining unit 44 determines that the actual tape length ActualBackhitchlessWriteInterval is not below the minimum tape length BackhitchlessThresholdInterval, the determination result is set to indicate that backhitchless writing is to be performed when new writing operations are started (step 564). By contrast, when the backhitch determining unit 44 determines that the actual tape length ActualBackhitchlessWriteInterval is below the minimum tape length BackhitchlessThresholdInterval, the determination result is set to indicate that backhitchless writing is not to be performed when new writing operations are started (step 565).

It should be noted that the four operation examples described above are merely examples of operations at the backhitch determining unit 44. For example, a determination method based on the data writing state before the writing of the current data to the tape 23 starts, as similar to the first and fourth operation examples, may be employed, or a determination method based on the state of occurrence of a certain event before the writing of the current data to the tape 23 starts, as similar to the second and third operation examples, may be employed. In a broader sense, the backhitch determining unit 44 may be considered to determine whether or not to perform backhitchless writing on the basis of a state before the writing of the current data to the tape 23 starts.

Figure 13:
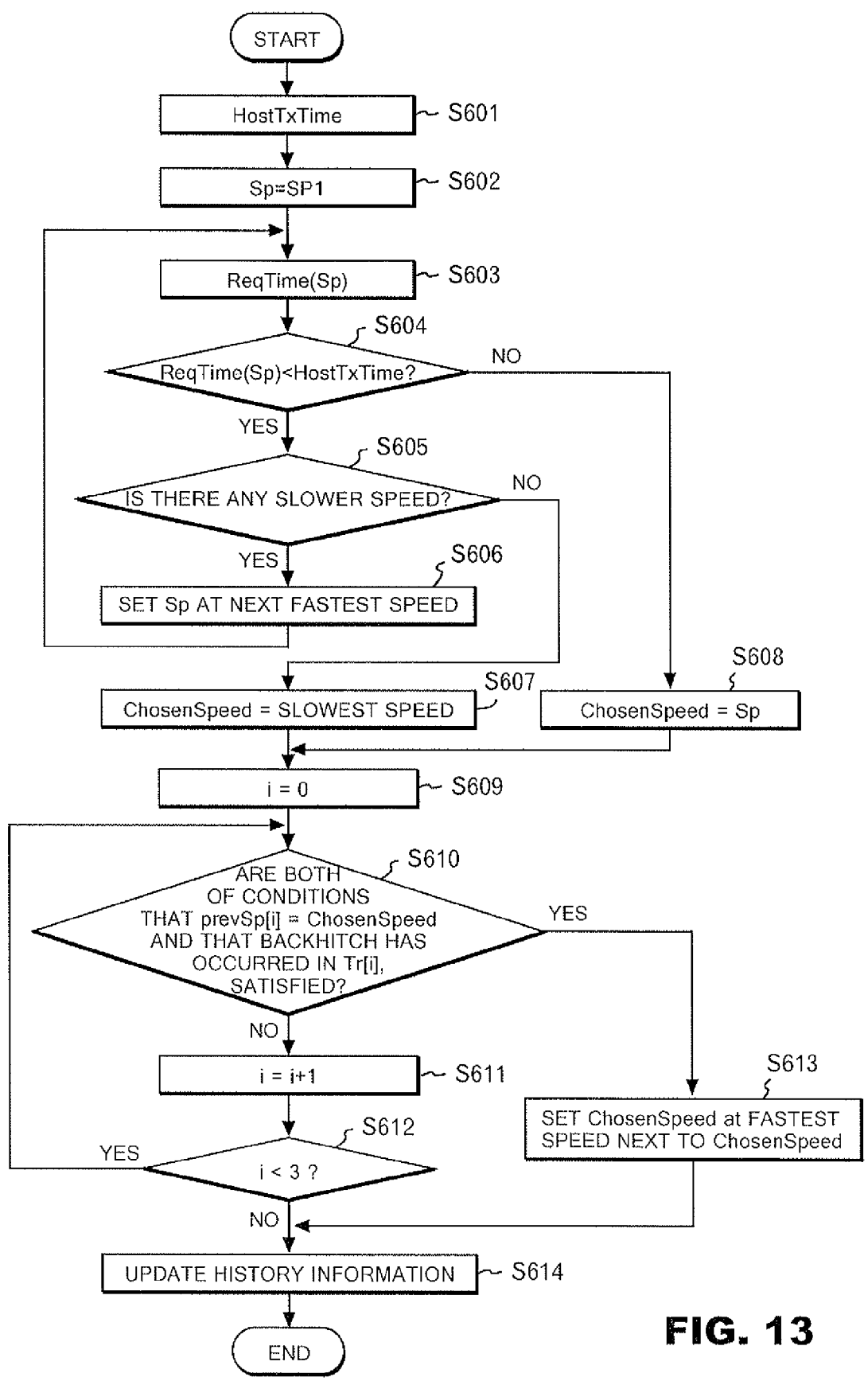
FIG. 13 is a flowchart showing an operation example of a speed determining unit in the controller according to the embodiment of the present invention.

FIG. 13 is a flowchart showing an operation example in the tape speed determination processing. Here, this operation example is for additionally determining whether to perform SWBF writing or a backhitch at the timing of a synchronization, even when the capacity standard for performing SWBF writing is satisfied.

Firstly, the speed determining unit 45 estimates a time HostTxTime of transfer from the host 30 in the next transaction, on the basis of the last transaction size and host transfer rate (step 601). Here, the transfer time HostTxTime can be the average of the times of transfer from the host 30 in the last three transactions, for example. Specifically, assume that TransactionSize denotes the average transaction size in the last three transactions, and that HostTxRate denotes the average host transfer rate in the last three transactions. The transfer time HostTxTime can be obtained by the following expression: HostTxTime=TransactionSize/HostTxRate. Here, the speed determining unit 45 can obtain the average transaction size TransactionSize and the average host transfer rate HostTxRate as input data in advance, from the transaction processing history information stored in the history storing unit 47.

Then, the speed determining unit 45 estimates a time ReqTime(Sp) required for writing data of the next transaction at a speed Sp, on the basis of the last transaction size and media transfer rates at different speeds. Then, by comparing the transfer time HostTxTime and the required time ReqTime(Sp), the speed determining unit 45 slows down the speed Sp so that the fastest speed among those not causing any backhitch due to the buffer 12 running out of data can be chosen as the speed Sp.

Specifically, the speed determining unit 45 substitutes a speed SP1 into the variable Sp denoting a tape speed, the speed SP1 being the fastest speed among those stored in the speed table storing unit 46 (step 602). Then, the speed determining unit 45 calculates the time ReqTime(Sp) required for writing data of a transaction at the tape speed Sp (step 603). Here, the required time ReqTime(Sp) can be the average of the times respectively required for writing data of the last three transactions at the specific speed Sp, for example. Specifically, assume that TransactionSize denotes the average transaction size of the last three transactions, and that MediaTxRate(Sp) denotes time required for writing data of a transaction at the specific speed Sp. The required time ReqTime(Sp) can be obtained by the following expression: ReqTime(Sp)=TransactionSize/MediaTxRate(Sp). Here, the speed determining unit 45 can obtain the average transaction size TransactionSize as input data in advance, from the transaction processing history information stored in the history storing unit 47, and can obtain the required time MediaTxRate(Sp) as input data in advance, from information for each tape speed stored in the speed table storing unit 46.

Thereafter, the speed determining unit 45 determines whether or not the required time ReqTime(Sp) is below the transfer time HostTxTime (step 604). When time required for the transfer of data is longer than time required for the writing of the same data to the tape 23, there is a possibility that the buffer 12 runs out of data. Accordingly, the speed determining unit 45 determines here whether the current state is such a state or not.

When determining that the required time ReqTime(Sp) is below the transfer time HostTxTime, the speed determining unit 45 further determines whether or not a speed slower than the speed currently set as the speed Sp is present (step 605). Here, the speed determining unit 45 can determine whether or not a speed slower than the current speed Sp is registered as an entry in the speed table storing unit 46. When such a speed is registered, the speed Sp is set at the next fastest speed (step 606), and the process returns to step 603.

Assume that the speed determining unit 45 determines that there is no speed slower than the currently set one, in step 605, in the course of repeating step 603 to step 606. In this case, a variable ChosenSpeed representing a chosen speed is set at the slowest speed among those registered in the speed table storing unit 46 (step 607). By contrast, when the speed determining unit 45 determines, in step 604, that the required time ReqTime(Sp) is not below the transfer time HostTxTime, the variable ChosenSpeed representing a chosen speed is set at the current speed Sp (step 608).

The processing in step 601 to step 608 corresponds to the above-described first process. Subsequently, the speed determining unit 45 refers the speeds respectively chosen in the last three transactions. Here, if a backhitch has occurred at any of the chosen speeds, the speed may be too fast. Accordingly, a speed slower than this speed is re-chosen.

Specifically, the speed determining unit 45 substitutes "0" in an index i identifying the last transaction (step 609). Then, the following process is performed for each of the cases in which i=0, 1 and 2, respectively. Here, the i-th transaction is denoted by Tr[i], and the transactions are hence denoted by Tr[0], Tr[1], and Tr[2] in order from the most recent.

To be more precise, the speed determining unit 45 first determines whether or not both of the following conditions are satisfied, the conditions are that: a variable prevSp[i] representing the speed of the tape 23 at the time of writing data of the transaction Tr[i] is equal to the variable ChosenSpeed chosen in step 607 or step 608; and a backhitch occurred in the transaction Tr[i] (step 610).

In all cases except the case that both of the above-described conditions are satisfied, i.e. except the case that the variable prevSp[i] is equal to the variable ChosenSpeed chosen in step 607 or step 608, and that a backhitch occurred in the transaction Tr[i], the speed determining unit 45 adds "1" to the index i (step 611), and then determines whether or not the resultant index i is smaller than "3" (step 612). When the index i is smaller than "3," the process returns to step 610. By contrast, when the index i is equal to "3," the history information stored in the history storing unit 47 is updated (step 614). Specifically, in step 614, the history information on the transaction Tr[1] is set to be history information on the transaction Tr[2]; the history information on the transaction Tr[0] is set to be history information on the transaction Tr[1]; and the history information on the current transaction is set to be history information on the transaction Tr[0].

On the other hand, when it is determined, in step 610, that a variable prevSp[i] is equal to the variable ChosenSpeed chosen in step 607 or step 608, and also that a backhitch occurred in the transaction Tr[i], the speed determining unit 45 sets the variable ChosenSpeed at the fastest speed next to the variable ChosenSpeed (step 613). Then, the history information stored in the history storing unit 47 is updated (step 614). Specifically, in step 614, the history information on the transaction Tr[1] is set to be history information on the transaction Tr[2]; the history information on the transaction Tr[0] is set to be history information on the transaction Tr[1]; and the history information on the current transaction is set to be history information on the transaction Tr[0].

The processing in step 609 to step 614 corresponds to the above-described second process. As can be understood from the flow shown in FIG. 8 including step 404, this tape speed determination processing is only executed when the transaction size is smaller than the size of the buffer 12 (1 GB, for example) for the following reason.

When a transaction size is larger than the size of the buffer 12, the buffer 12 may become full before starting to write buffered data to the tape 23, which causes the host transfer to be suspended. The suspended state of the host transfer decreases the host transfer rate. In such a case, more complicated calculation is required, and hence the above-described tape speed determination processing is not used.

The description of this embodiment has been given hereinabove. As described above, in this embodiment, a backhitch is performed to change the tape speed if there is a possibility that a backhitch due to the buffer 12 running out of data occurs, even in a case where backhitchless writing is determined to be performed from the perspective of the amount of data possible to be written to the tape 23 eventually. With this configuration, it is possible to prevent decrease in performance attributable to a backhitch at the time of synchronization when the transaction size is large, and also decrease in performance attributable to a backhitch due to the buffer 12 running out of data.

Although the configuration is made such that a backhitch can be performed prior to changing the speed of the tape 23 in this embodiment, the configuration may be made such that the speed of the tape 23 can be changed without performing any backhitch. The present invention may be entirely implemented by hardware, or software, or can be implemented by combination of hardware and software. Moreover, the present invention can be implemented by a computer, a data processing system, and a computer program. The computer program can be stored in a computer readable medium to be thereby provided. Here, an electronic, magnetic, optical, electromagnetic, infrared or semiconductor system (device or equipment), or a propagation medium is conceivable as the medium. Examples of the computer readable medium can be a semiconductor, a solid-state memory, a magnetic tape, a removable computer diskette, a random access memory (RAM), a read-only memory (ROM), a rigid magnetic disk, and an optical disk. Current examples of the optical disk include a compact disk read-only memory (CD-ROM), a compact disk read/write (CD-R/W) and a digital video disc (DVD).

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A system for controlling the traveling of a tape in a tape drive which temporarily stores data in a buffer before writing the data to the tape, the system comprising:
    a determination unit for determining if second data is to be written to the tape without performing a backhitch after first data is written to the tape, the determination unit determining a state of the system before writing the first data to the tape, the determination unit comparing an amount of second data written to the tape with an amount of second data expected to be written to the tape to an area up to a position on the tape where writing the first data commenced, for determining if the second data is to be written to the tape without performing a backhitch, the second data comprising data stored adjacent to first data stored in the buffer; and
    a speed adjusting unit for adjusting the speed of the tape to prevent a backhitch due to the buffer running out of data when the determination unit determines that the second data is to be written to the tape without performing a backhitch.

2. The system according to claim 1 wherein the determination unit compares a number of times second data was written to the tape without performing a backhitch with a predetermined number of times second data can be written to the tape without performing a backhitch, for determining if the second data is to be written to the tape without performing a backhitch.

3. The system according to claim 1 wherein the determination unit compares a error frequency with a predetermined error frequency when writing second data to the tape without a backhitch, for determining if the second data is to be written to the tape without performing a backhitch.

4. The system according to claim 1 wherein the determination unit compares a first position on the tape where writing the first data to the tape started and a second position on the tape where writing the second data to the tape without a backhitch started with a predetermined interval between the first and second positions for determining if the second data is to be written to the tape without performing a backhitch.

5. The system according to claim 1 wherein the speed adjusting unit adjusts the speed of the tape to a predetermined speed so that a time period required for storing data of a predetermined size in the buffer is less than a time period required for writing data of the predetermined size to the tape.

6. A system for controlling the traveling of a tape in a tape drive which temporarily stores data transmitted from a higher-level system in a buffer and thereafter writes the data to the tape, the system comprising:
    a determination unit for determining if second data is to be written to the tape without performing a backhitch after first data is written to the tape, the determination unit determining a state of the system before writing the first data to the tape, the second data comprising data stored adjacent to first data stored in the buffer;
    a speed choosing unit choosing a first speed when the determination unit determines that the second data is to be written to the tape without performing a backhitch, the first speed being the fastest speed satisfying a condition that time required for storing data in the buffer of a predetermined size transmitted from the higher-level system is shorter than time required for writing to the tape the data of the predetermined size stored in the buffer, among a plurality of speeds prepared in advance as the speed of the tape;
    the speed choosing unit choosing a second speed that is slower than the first speed from the plurality of speeds, when the first speed chosen by the speed choosing unit is used and a backhitch thereby occurred in anyone of a last predetermined number of times of data writing; and
    a change unit changing the speed of the tape to the second speed after a backhitch is performed, when the second speed chosen is different from the current speed of the tape.

7. A method of controlling the traveling of a tape in a tape drive which temporarily stores data transmitted from a higher-level system in a buffer and thereafter writes the data to the tape, the method comprising the steps of:
    determining if second data is to be written to the tape without performing a backhitch after first data is written to the tape, the second data comprising data stored adjacent to first data stored in the buffer;
    determining a state of the system before writing the first data to the tape;
    choosing a first speed when it is determined that the second data is to be written to the tape without performing a backhitch, the first speed being the fastest speed satisfying a condition that time required for storing data in the buffer of a predetermined size transmitted from the higher-level system is shorter than time required for writing to the tape the data of the predetermined size stored in the buffer, among a plurality of speeds prepared in advance as the speed of the tape;
    choosing a second speed that is slower than the first speed from the plurality of speeds, when the first speed chosen by the speed choosing unit is used and a backhitch thereby occurred in anyone of a last predetermined number of times of data writing; and
    changing the speed of the tape to the second speed after a backhitch is performed, when the second speed chosen is different from the current speed of the tape.

8. A computer program product for controlling the traveling of a tape in a tape drive which temporarily stores data transmitted from a higher-level system in a buffer, and thereafter writes the data to the tape, the computer readable program product comprising:
    a non-transitory computer readable storage medium having computer readable program code embodied therewith, the computer readable program code comprising:
    computer readable program code configured to determine if second data is to be written to the tape without performing a backhitch after first data is written to the tape, the second data comprising data stored adjacent to first data stored in the buffer;
    computer readable program code configured to determine a state of the system before writing the first data to the tape;
    computer readable program code configured to choose a first speed when it is determined that the second data is to be written to the tape without performing a backhitch, the first speed being the fastest speed satisfying a condition that time required for storing data in the buffer of a predetermined size transmitted from the higher-level system is shorter than time required for writing to the tape the data of the predetermined size stored in the buffer, among a plurality of speeds prepared in advance as the speed of the tape;

computer readable program code configured to choose a second speed that is slower than the first speed from the plurality of speeds, when the first speed chosen by the speed choosing unit is used and a backhitch thereby occurred in anyone of a last predetermined number of times of data writing; and computer readable program code configured to change the speed of the tape to the second speed after a backhitch is performed, when the second speed chosen is different from the current speed of the tape.

* * * * *